United States Patent [19]

Yu

[11] Patent Number: 4,908,222
[45] Date of Patent: Mar. 13, 1990

[54] MICROWAVE BREWING APPARATUS AND METHOD

[76] Inventor: Dong Yu, 90 Hewitt Crescent, Ajax, Ontario, Canada, L1S 7B3

[21] Appl. No.: 322,980

[22] Filed: Mar. 14, 1989

[30] Foreign Application Priority Data

Feb. 16, 1989 [CA] Canada .................................. 591303

[51] Int. Cl.$^4$ ............................ A23F 5/26; H05B 6/80
[52] U.S. Cl. ............................. 426/241; 219/10.55 E; 219/10.55 M; 426/234; 99/306; 99/DIG. 14
[58] Field of Search ........................ 426/241, 243, 234; 219/10.55 E, 10.55 M; 99/306, 300, DIG. 14

[56] References Cited

U.S. PATENT DOCUMENTS

| | | | |
|---|---|---|---|
| 2,365,269 | 12/1944 | Hill | 99/305 |
| 4,104,957 | 8/1978 | Freedman et al. | 99/306 |
| 4,345,512 | 8/1982 | Moore | 219/10.55 E |
| 4,381,696 | 5/1983 | Koral | 426/241 |
| 4,386,109 | 5/1983 | Bowen et al. | 426/241 |
| 4,577,080 | 3/1986 | Grossman | 219/10.55 E |
| 4,613,745 | 9/1986 | Marotta et al. | 99/306 |
| 4,721,835 | 1/1988 | Welker | 219/10.55 E |
| 4,756,915 | 7/1988 | Dobry | 99/306 |

*Primary Examiner*—George Yeung
*Attorney, Agent, or Firm*—James W. Hellwege

[57] ABSTRACT

A beverage brewing apparatus and method using microwave energy is disclosed. The apparatus comprises a pressurizable water reservoir and a filter chamber disposed below the reservoir. The reservoir is provided with pressure overflow means which, in operation, prevents water in the reservoir from overflowing into the filter chamber until vapor pressure is built up in the reservoir due to the influx of microwave energy so as to force the heated water to overflow into the filter chamber to mix with an infusible material, e.g. ground coffee to make a beverage.

10 Claims, 1 Drawing Sheet

MICROWAVE BREWING APPARATUS AND METHOD

BACKGROUND OF THE INVENTION

This invention relates to an apparatus for brewing coffee, tea or other beverages from respective infusible materials using microwave energy, and to a method of making such beverages.

Microwave coffee makers are known in the art. U.S. Pat. No. 4,104,957 issued to Freedman et al. discloses a drip-type appliance containing a thermally controlled valve in a microwave transparent water reservoir which is positioned over a coffee compartment which in turn is placed above a receptacle. For use, the reservoir is filled with an amount of water, ground coffee is placed on the filter in the coffee compartment, the appliance is placed in a microwave oven and the oven is operated for a selected period of time. When the temperature of water reaches a predetermined level, the valve opens allowing the heated water to flow down through the coffee grounds.

U.S. Pat. No. 4,381,696 issued to Koral proposes a similar solution except for the valve between the water reservoir and the coffee compartment being manually operated. After water has been placed in the reservoir, the valve is opened manually immediately before or during the activation of the microwave oven with the coffee maker disposed therein.

U.S. Pat. No. 4,386,109 issued to Bowen et al. teaches an expresso-type coffee maker for use in a microwave oven. Water is stored in a microwave transparent reservoir which is separated from a receptacle by a layer of coffee grounds placed over a strainer. The coffee layer is compressed and forms a pressure resistant seal over the water outlet from the reservoir. When the water in the reservoir is heated by microwave energy the pressure in the reservoir rises to a level sufficient to force steam and water through the coffee layer into the receptacle.

Another drip-type coffee maker is described in U.S. Pat. No. 4,577,080 to Grossman. The maker comprises a water container positioned above a coffee compartment which is separated from the container by a partition. The partition has perforations sealed with a thermally responsive material that melts when the water is heated to the desired temperature in the microwave oven, allowing the heated water to flow from the upper reservoir through the coffee grounds into a receptacle placed below the coffee maker.

The latter design is apparently intended to be a disposable coffee maker.

It will be appreciated that these and similar microwave coffee makers can be designed to prepare small quantities of coffee, such as a single cup, or to brew larger quantities. In any case, their dimensions, of course, must be such as to allow the appliances to be accommodated in an average microwave oven.

While the above-described microwave coffee makers are useful, there is still a need for a simple and reliable drip-type brewing appliance for use in a microwave oven, the appliance not employing complicated mechanical units such as opening valves or pressure relief valves, and suitable for repeated use.

STATEMENT OF THE INVENTION

According to the present invention, there is provided an apparatus for brewing coffee, tea or a similar beverage from a respective infusible material i.e. ground coffee beans, tea leaves etc., using a typical microwave oven. The apparatus is adapted to be placed over a coffee mug, a cup or another common beverage receptacle with an open upper end and comprises a microwave transparent filter chamber having a filter positioned in a bottom part thereof, the filter adapted for holding a quantity of an infusible material and for the dispensing of a brewed beverage therefrom into the receptacle, and a pressurizable microwave transparent reservoir adapted to hold a quantity of a liquid up to a predetermined level, the reservoir positioned generally above said filter chamber and being in fluid communication therewith through a pressure overflow means which is adapted to hold the liquid within the reservoir until pressure in the reservoir rises sufficiently to force the liquid at least partly through the overflow means into the filter chamber.

Pressure overflow means are known in various fields of technology. Most commonly, such means are employed in a sink drain wherein two columns of water stay at the same level until additional hydrostatic pressure is exerted onto one column making the liquid from the other column overflow to the disposal system.

In one embodiment of the apparatus of the present invention, the pressure overflow means is an inverted U-tube, one end of which is connected to the bottom of the reservoir and the other end extends close to and above the bottom of the reservoir. The U-tube extends above both its ends so that the bend of the U-shape rises above the predetermined level of liquid in the reservoir when filled.

In another embodiment of the apparatus, the pressure overflow means comprises an overflow conduit which extends upwardly from the bottom of the reservoir and thus connects the reservoir with the filter chamber, wherein the upper end of the overflow conduit is disposed above the predetermined liquid level in the reservoir. The overflow conduit is partly encompassed by an upflow conduit having a closed upper end which extends above the upper end of the overflow conduit, and an open lower end extending close to and above the bottom of the reservoir. In this way, an upflow passage and a downflow passage surrounded by the upflow passage are formed.

It has been found that the apparatus of the present invention may be used in a novel manner to obtain beverages which appear to absorb more aroma from the infusible material than those made in a known way. The method comprises the following steps:

(a) pouring a liquid into the liquid reservoir to a level not exceeding the overflow level of the pressure overflow means, (b) placing a supply of an infusible material such as ground coffee in the filter chamber, (c) pouring a liquid into the beverage receptacle, (d) closing the reservoir, positioning it over the filter chamber and placing the reservoir and the chamber over the receptacle, (e) heating the liquid in the reservoir and in the receptacle with microwave energy to raise the liquid vapor pressure in the reservoir sufficiently to force said liquid from the reservoir through the pressure overflow means into the filter chamber to make a beverage, and to raise vapors from the liquid in the receptacle to contact the infusible material in the filter chamber, and (f) collecting the beverage in the receptacle.

The steps (a), (b) and (c) may be performed in any sequence.

The filter chamber may be made of a microwave absorbing material so that the infusible material is not heated by microwave energy. It has been found, however, that the method of the invention, at least when applied to coffee, provides a coffee with a good aroma.

BRIEF DESCRIPTION OF THE DRAWINGS

In the drawings which illustrate embodiments of the present invention.

DETAILED DESCRIPTION OF THE INVENTION

Figure 1:
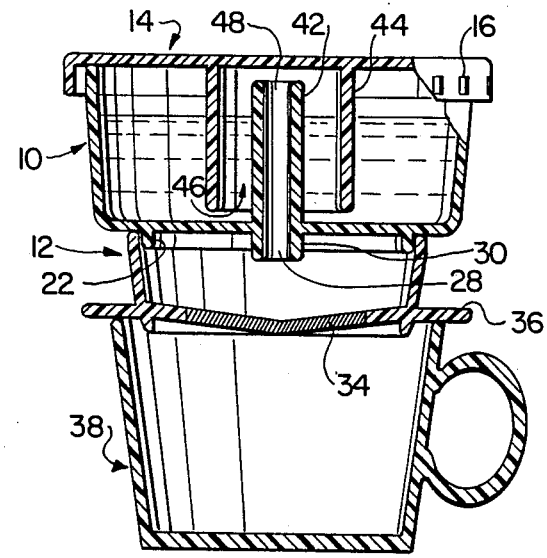
FIG. 1 is a vertical sectional view of one embodiment of the apparatus.

Referring to the drawings in which like numerals correspond to like parts or elements, the apparatus of the present invention comprises a water reservoir 10 and a filter chamber 12. The reservoir 10 has a matching twist-closure cap 14 which ensures virtually hermetic closure of the reservoir 10. To facilitate its handling, the cap has a number of ribs 16 on its external peripheral surface. Threads 18 and 20 serve to engage the cap with the reservoir 10.

Figure 2:
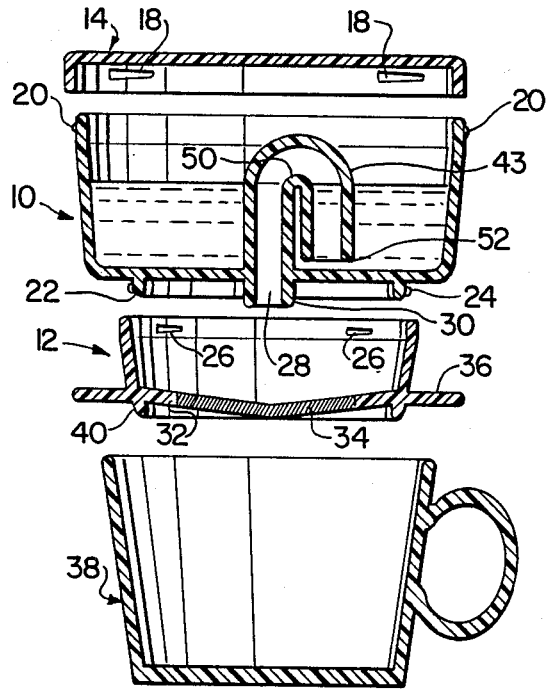
FIG. 2 is an exploded vertical sectional view of another embodiment of the apparatus.

The reservoir 10 has an annular rim 22 at the bottom to facilitate the coupling of the reservoir 10 with the upper rim of the filter chamber 12 The rim 22 may provide frictional engagement with the wall of the chamber, as shown in FIG. 1, or a threaded connection may be employed as illustrated in FIG. 2, using threads 24 and 26. The reservoir has an opening 28 in the bottom from which depends a short tubular portion 30 which serves to concentrate the flow of liquid into the chamber 12.

The filter chamber has a concave bottom 32 with a metal filter molded thereinto The filter 34 has perforations of a size adapted to retain the particles of an infusible material, e.g. coffee grounds, and to allow the passage of a liquid therethrough. The chamber has also a peripheral support disc 36 of a size adapted to cover most of conventional beverage receptacles such as for instance a coffee. It is preferable to provide a small passage between the receptacle 38 and the disc 36 for excess steam to escape. An annular lip 40 is provided on the underside of the filter chamber 12, which serves as an abutment element for safe positioning of the apparatus over the receptacle 38. The concavity of the bottom 32 of the chamber 12 helps to keep the flow of liquid from the chamber close to the centre of the filter.

The receptacle 38 does not constitute a part of the apparatus of the invention. It is preferable, however, that the receptacle is of a microwave transparent variety.

When the reservoir is filled with water up to a predetermined level as indicated in the drawings, the water is prevented from flowing downwards into the chamber 12 by an overflow tube 42 (FIG. 1) or an inverted U-tube 43 (FIG. 2), both aligned with the respective openings 28 at the bottom of the reservoir 10. As shown in FIG. 1, the upper edge of the tube 42 extends above the water level. An external tube 44, concentric with tube 42, depends from the cap 14 so that it overlaps most of the length of tube 42 and extends close to the bottom of the reservoir 10 when the cap 14 is secured to the reservoir 10.

As shown in FIG. 1, the external tube 44 and the overflow tube 42 define an external annular passage 46 and an internal tubular passage 48.

As shown in FIG. 2, the U-tube 43 hss a bend 50 which is disposed above the water level. Consequently, water rises in the right hand side leg of the U-tube only, as seen in the drawing, through the open end 52 of the U-tube 43.

The inverted U-tube 43 is connected to the bottom of the reservoir 10 by means of a threaded connection, not illustrated in the drawing. The tubular portion 30 is part of the U-tube 43.

In the embodiment illustrated herein, the reservoir, the cap 14 and the filter chamber 12 (except the filter) are made of polycarbonate, a microwave transparent plastic resistant to the boiling water temperature. Alternatively, other microwave transparent materials, well known in the art, may be employed The receptacle 38 is preferably made of a microwave semi-transparent material so that in use, a liquid in the receptacle 38 is heated more slowly than in the reservoir 10.

In operation, the apparatus is first disassembled as shown in FIG. 2. A quantity of coffee grounds, for example, is placed on the filter 34 and the filter chamber is coupled with the reservoir 10. An amount of water, e.g. about 100 ml, is poured into the receptacle 38. The reservoir is filled with water in a desired amount of beverage less the amount placed in the receptacle 38, up to the overflow level defined by the upper edge of the tube 42 (FIG. 1) or by the bend 50 of the inverted U-tube (FIG. 2) to avoid spilling cold water onto the coffee grounds. The reservoir is then closed with the cap 14 and positioned, together with the filter chamber, over the receptacle 38. The entire set is placed in a microwave oven. It will be appreciated that this sequence may be changed and still obtain the same result.

Turning now to the embodiment of FIG. 1, when the microwave energy heats the water in the reservoir, water vapor pressure rises above the water surface forcing the water into the annular passage 46 and then to overflow through the passage 48. This operation continues until water level in the reservoir drops to the level of the open end of the external tube 44. The heated water flows into the filter chamber 12 and through the coffee grounds, and then through the filter 34 into the receptacle 38. Simultaneously with water in the reservoir, water in the receptacle 38 is heated to such a degree that water vapor rises in the receptacle 38 and contacts the coffee grounds in the chamber 12 through the perforations of the filter 34. Since chamber 12 is also made of a microwave transparent or semi-transparent material, the coffee grounds are heated to a certain degree. The combination of the direct heating of the coffee grounds, the extraction of aromatic substances by rising vapor and the infusion by the hot dripping water from the reservoir results in a very aromatic beverage.

Referring now to the embodiment of FIG. 2, the U-tube 43 performs a similar function as the tubes 42 and 44 when the same steps are carried out as with the apparatus of FIG. 1. When the water in the reservoir 10 is heated, the vapor pressure in the reservoir rises and forces the water through the U-tube 43 and through the opening 28 into the filter chamber 12.

For manufacturing convenience, tubes 42 and 44 can be made integral with the reservoir 10 and cap 14 respectively. The tube 43 may be manufactured separately from a microwave transparent plastic and connected to the bottom of the reservoir 10 by means of a thread or in another manner.

While a single cup coffee maker is shown in the drawing, it is to be appreciated that a larger coffee maker with a correspondingly larger receptacle may be employed, subject to the size of a microwave oven to be used.

I claim:

1. A method of making a beverage from an infusible material in a microwave oven, which employs an apparatus having a microwave transparent pressurizable liquid reservoir disposed above a microwave transparent filter chamber adapted to hold a quantity of the infusible material, the reservoir and the filter chamber adapted to be placed over a beverage receptacle, the liquid reservoir being in fluid communication with the filter chamber through a pressure overflow means, the method comprising:

pouring a liquid into the liquid reservoir to a level not exceeding the overflow level of the overflow means, placing a supply of an infusible material in the filter chamber, pouring a liquid into the beverage receptacle, closing said reservoir, positioning it over said filter chamber and placing the reservoir and the chamber over the receptacle, heating said liquid in said reservoir and in said receptacle with microwave energy to raise the liquid vapor pressure in the reservoir sufficiently to force said liquid from the reservoir through the pressure overflow means into the filter chamber to make a beverage, and to raise vapors from the liquid in the receptacle to contact the infusible material in the filter chamber, and collecting the beverage in said receptacle.

2. The method of claim 1 wherein the liquid is water.

3. The method of claim 1 wherein the filter chamber is microwave absorbing.

4. A beverage brewing apparatus for use in a microwave oven, adapted to be placed over a beverage receptacle having an open upper end, cmprising:

a microwave transparent filter chamber having a filter positioned in a bottom part thereof, the filter adapted for holding a quantity of an infusible material and for the dispensing of a brewed beverage therefrom into the receptacle, and a pressurizable microwave transparent reservoir adapted to hold a quantity of a liquid up to a predetermined level, the reservoir positioned generally above said filter chamber, and a pressure overflow means through which the reservoir is in fluid communication with said chamber and which is adapted to hold the liquid within the reservoir until pressure in the reservoir rises sufficiently to force the liquid at least partly through the overflow means into the filter chamber.

5. The apparatus of claim 4 wherein the pressure overflow means comprises an inverted U-tube, one end of the U-tube being connected to an opening in the bottom of the reservoir, the open distal end of the U-tube etending above the bottom of the reservoir therewithin and the bend of the U-tube extending above both ends and above the predetermined liquid level in the reservoir.

6. The apparatus of claim 4, wherein the pressure overflow means comprises an overflow conduit which connects the reservoir with the filter chamber, the upper end of the overflow conduit being disposed above the predetermined liquid level in the reservoir, and an upflow conduit partly surrounding the overflow conduit and having a closed upper end extending above the upper end of the overflow conduit, and an open lower end extending adjacent to and above the bottom of the reservoir.

7. The apparatus of claim 6 wherein the overflow conduit is part of the bottom of the reservoir and the upflow conduit is part of a removable cover of the reservoir.

8. The apparatus of claims 4, 5 or 6 wherein the beverage receptacle is made of a microwave transparent material.

9. The apparatus of claims 4, 5 or 6 comprising supporting means for holding the apparatus over the upper open end of the beverage receptacle, the means being of a size adapted to cover at least partly the open end of said receptacle.

10. The method of claim 1 wherein the infusible material is ground coffee.

* * * * *